United States Patent
Schutten et al.

(10) Patent No.: US 7,869,237 B1
(45) Date of Patent: Jan. 11, 2011

(54) PHASE-SHIFTED BRIDGE WITH AUXILIARY CIRCUIT TO MAINTAIN ZERO-VOLTAGE-SWITCHING

(75) Inventors: Michael J. Schutten, Rotterdam, NY (US); Robert Louis Steigerwald, Burnt Hills, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 381 days.

(21) Appl. No.: 11/965,327

(22) Filed: Dec. 27, 2007

(51) Int. Cl.
  *H02M 7/5387* (2007.01)
(52) U.S. Cl. .......................... 363/132; 363/17; 363/98
(58) Field of Classification Search ............. 363/16–20, 363/21.03, 56.05, 79, 91, 98, 132, 127; 315/219
  See application file for complete search history.

(56) References Cited

U.S. PATENT DOCUMENTS

| | | | |
|---|---|---|---|
| 4,169,241 A | 9/1979 | Peer et al. | |
| 4,688,165 A | 8/1987 | Pruitt | |
| 4,691,270 A | 9/1987 | Pruitt | |
| 4,761,722 A | 8/1988 | Pruitt | |
| 4,864,479 A | 9/1989 | Steigerwald et al. | |
| 4,999,524 A * | 3/1991 | Williams et al. | 307/54 |
| 5,132,889 A * | 7/1992 | Hitchcock et al. | 363/17 |
| 5,414,238 A | 5/1995 | Steigerwald et al. | |
| 5,451,962 A | 9/1995 | Steigerwald | |
| 5,546,294 A | 8/1996 | Schutten et al. | |
| 5,570,276 A * | 10/1996 | Cuk et al. | 363/16 |
| 5,880,949 A | 3/1999 | Melhem et al. | |
| 5,946,200 A * | 8/1999 | Kim et al. | 363/17 |
| 6,011,708 A * | 1/2000 | Doht et al. | 363/98 |
| 6,310,785 B1 | 10/2001 | Ayyanar et al. | |
| 6,347,045 B1 * | 2/2002 | Poon et al. | 363/39 |
| 6,611,444 B2 | 8/2003 | Ayyanar et al. | |
| 6,693,805 B1 | 2/2004 | Steigerwald et al. | |
| 6,954,367 B2 | 10/2005 | Yang et al. | |
| 6,984,964 B2 | 1/2006 | Chang | |
| 7,209,370 B2 * | 4/2007 | Phadke et al. | 363/17 |
| 7,515,446 B2 * | 4/2009 | Lin | 363/98 |
| 7,609,532 B1 | 10/2009 | Schutten et al. | |
| 2002/0034083 A1 | 3/2002 | Ayyanar et al. | |
| 2002/0044461 A1 | 4/2002 | Jang et al. | |
| 2005/0041439 A1 | 2/2005 | Jang et al. | |

OTHER PUBLICATIONS

A New ZVS-PWM Full-Bridge Converter, Yungtaek Jang, et al, IEEE Transactions on Power Electronics, vol. 18, No. 5, Sep. 2003.

(Continued)

*Primary Examiner*—Rajnikant B Patel
(74) *Attorney, Agent, or Firm*—Duane Morris LLP

(57) ABSTRACT

A phase-shifted PWM dc-to-dc converter includes a pair of switched half-bridges defining taps. The primary of an output transformer is coupled across the taps to receive AC, and produces transformed AC which is rectified and filtered to produce the output dc. Zero-voltage-switching (ZVS) is maintained over the full range from zero load current to maximum load current by the use of an auxiliary circuit including an "inverting" second transformer having primary and secondary windings serially coupled with capacitors. The primary-capacitor serial circuit is connected between a first half-bridge tap and reference potential, and the secondary-capacitor serial circuit is connected by an inductance between second half-bridge tap and a reference potential.

25 Claims, 5 Drawing Sheets

OTHER PUBLICATIONS

A New PWM ZVS Full-Bridge Converter, Yungtaek Jang, et al, Power Electronics Laboratory, Delta Products Corporation, APEC 2006.

"Auxiliary Series Resonant Converter: A New Converter for High-Voltage, High-Power Applications," V. Vlatkovic, et al, IEEE Applied Power Electronics Conf., 1996, p. 493-499.

Analysis and Design of a Saturable Reactor Assisted Soft-S witching Full-Bridge dc-dc Converter, Satoshi Hamada, et al, IEEE Transactions on Power Electronics, vol. 9, No. 3, May 6, 1994.

Novel Soft-Switching DC-DC Converter with Full ZVS-Range and Reduced Filter Requirement—Part 1: Regulated-Output Applications, Rajapandian Ayyanar, et al, IEEE Transactions on Power Electronics, vol. 16, No. 2, Mar. 2001.

Analysis and Design Considerations of a Load and Line Independent Zero Voltage Switching Full Bridge DC/DC Converter Topology, Praveen K. Jain, et al, IEEE Transactions on Power Electronics, vol. 17, No. 5, Sep. 2002.

An Improved Full-Bridge Zero-Voltage-Switched PWM Converter Using a Saturable Inductor, Guichao Hua, et al, IEEE Transactions on Power Electronics, vol. 8, No. 4, Oct. 1993.

A Novel ZVS-PWM Full-Bridge Converter Topology, Xiaogao Xie Wei Wang, et al, Power Electronics Research Institute, Zhejiang University, Hangzhou 3 10027, China, 2004 35th Annual IEEE Power Electronics Specialists Conference.

Integrated Magnetics Scheme for ZVS.Hybrid Converter with Improved Performance, X. Gao, et al, Department of Electrical Engineering, Arizona State University, Tempe, AZ, USA, 2004 35th Annual IEEE Power Electronics Specialists Conference.

ZVS PWM Full-Bridge Converters with Dual Auxiliary Circuits, Gerry Moschopoulos, at al, Concordia University, Dept. of Electrical & Computer Engineering, P. D. Ziogas Laboratory @2000 IEEE.

A PWM Full-Bridge Converter with Load Independent Soft Switching Capability, Gerry Moschopoulos, et al, Concordia University, Dept. of Electrical & Computer Engineering, P. D. Ziogas Laboratory 2000 IEEE.

Analysis and Optimal Design Considerations for an Improved Full Bridge ZVS DC-DC Converter with High EfficiencyWu.pdf, Xinke Wu, et al, IEEE Transactions on Power Electronics, vol. 21, No. 5, Sep. 2006.

A 1 kW 500 kHz Front-End Converter for a Distributed Power Supply System, Loveay H. Mweene, et al, IEEE Transactions on Power Electronics, vol. 6, No. 3, Jul. 1991.

Ayyanar et al, "Novel Soft-Switching DC-DC Converter with Full ZVS-Range and Reduced Filter Requirement-Part II: Constant-Input, Variable Out Applications", IEEE Transactions on Power Electronics, vol. 16, No. 2., pp. 193-200 (Mar. 2001).

U.S. Appl. No. 12/181,420 entitled "Voltage Clamps for Energy Snubbing", filed on Jul. 29, 2008 in the names of Michael J. Schutten and Robert L. Steigerwald, Inventors.

* cited by examiner

PHASE-SHIFTED BRIDGE WITH AUXILIARY CIRCUIT TO MAINTAIN ZERO-VOLTAGE-SWITCHING

BACKGROUND OF THE INVENTION

Field of the Invention

The phase-shifted resonant bridge has become a mainstay in the dc-to-dc power converter field, because it can provide low switching losses by virtue of zero-voltage switching (ZVS) at constant switching frequency. The low losses are very desirable, in that they allow the switching frequency to be high without undesirable heating of the switches. The high switching frequencies which ZVS allows in turn allows power converters to be made with physically small reactors such as capacitors and inductors.

FIG. 1 is a simplified schematic diagram of a dc-to-dc switching converter, similar to that described in "*a 1 kW 500 kHz Front-End Converter for a Distributed Power Supply System*," by Mweene et al, published in the IEEE Transactions on Power Electronics, Vol 6, No 3, July 1991. In FIG. 1, a first source of direct energizing voltage (or electrical potential) is illustrated by a conventional battery symbol and is designated 12. Direct energizing voltage is often referred to as direct current (dc). The dc voltage of source 12 is designated as an input voltage or Vi. Input voltage Vi is applied as +Ed to a first bus 14 relative to RTN, the second bus 16. A first inverter switching leg is designated A and includes first and second controllable switching devices, illustrated as field-effect transistors Q1 and Q2, respectively. A second inverter switching leg is designated B and includes third and fourth controllable switching devices, illustrated as field-effect transistors Q3 and Q4, respectively. The salient characteristics of the controllable switching devices is that each includes a controlled current path, which in the case of a FET is the drain-to-source path, and a control electrode, which is the gate electrode. Thus, FET Q1 is marked with the letters s, d and g to represent the source, drain, and gate electrodes. The other FETs are similarly marked. In FIG. 1, leg A is illustrated as including the "serial" or "series" combination of the drain-to-source current paths of FETs Q1 and Q2. Those skilled in the art will recognize that control of the gates of the FETs may result in lack of simultaneous current flow through both current paths, but for purposes of explanation the "serial" connection as illustrated in FIG. 1 will be understood. Leg A is illustrated as being connected "between" the buses 14 and 16. Those skilled in the art will recognize that the term "between" as used in electrical descriptions differs from the general physical meaning, in that the connection of leg A "between" buses 14 and 16 means that the legs are electrically connected to receive electric energy therefrom, not that they are physically situated between the buses. Similarly, leg B is coupled "between" buses 14 and 16. The connection of the two legs defines a "bridge" circuit designated 11.

In normal operation of a dc-to-dc converter such as that of FIG. 1, square-wave gate control signals are generated, as by a control block 18, and applied to the gates of switches Q1, Q2, Q3, and Q4 with phases selected, generally speaking, to turn ON or render conductive the controlled current paths of diagonally opposite switches of the bridge circuit 11. Thus, for example, switches Q1 and Q4 are rendered conductive while switches Q2 and Q3 are rendered nonconductive, and shortly thereafter switches Q2 and Q3 are rendered conductive while switches Q1 and Q4 are rendered nonconductive. This has the effect of alternately connecting to bus 14 and to bus 16 the A leg "tap point" At, which lies "between" switches Q1 and Q2, while simultaneously connecting to bus 14 and to bus 16, respectively, the B leg tap point Bt. This, in turn, causes tap points At and Bt to alternate, at the switching frequency, between the +Ed bus voltage and the -RTN bus voltage. The alternation of the voltages appearing at tap points At and Bt effectively produces an alternating voltage "between" the tap points.

The alternating voltage appearing between tap points At and Bt in FIG. 1 is applied to the primary winding T1p of a transformer T1. More particularly, tap point At is connected by way of a transformer primary winding connection point or terminal T1$p_1$. Similarly, tap point Bt is connected to a terminal by way of a transformer primary winding connection point or terminal T1$p_2$. As illustrated, an inductance designated Lt is connected between terminal T1$p_1$. Inductance Lt does not necessarily represent a discrete inductive element, but rather can represent, at least in part, the leakage inductance of transformer T1. Similarly, an inductance Lm is illustrated as being coupled "across" or in parallel with terminals T1$p1$ and T1$p2$. Inductance Lm represents at least the magnetizing inductance of transformer T1.

When an alternating voltage is applied from tap points At and Bt to the primary winding of transformer T1, an alternating voltage is induced or produced across secondary winding T1s. The alternating voltage appearing across the output or secondary winding terminals of transformer T1 is applied to a full-wave bridge rectifier designated generally as 30, which produces pulsating direct voltage on a pair of buses 31, 33. The pulsating direct voltage is applied by way of an output filter inductor Lo and "across" an output filter capacitor Co. Filter inductor Lo and filter capacitor Co filter ripple, in known fashion, to produce generally ripple-free direct output direct voltage Vo.

The dc-to-dc converter 10 of FIG. 1 thus receives direct voltage from a source 12, converts the direct voltage to alternating voltage in the bridge 11, and converts the alternating voltage to a secondary alternating voltage by way of transformer T1. The magnitude of the secondary alternating voltage is be selected by the primary-to-secondary winding or turns ratio of transformer T1, as known in the art. The secondary alternating voltage at the secondary winding of transformer T1 is rectified and filtered to produce an output direct voltage Vo. The dc-to-dc converter 10 thus provides, by virtue of interwinding insulation of transformer T1, electrical isolation between the source of direct voltage 12 and the output direct voltage Vo. It also allows the output voltage Vo to be selected to be different from (either greater than or less than) the source voltage.

Those skilled in the art know that control of the relative phases of the control signals applied to the various controllable switches of dc-to-dc converter 10 of FIG. 1 allows the voltage generated between tap points At and Bt to be varied. This variation as a function of phase is often used as part of a feedback control system for controlling the output direct voltage Vo.

It is desirable to cause the controllable switches of the dc-to-dc converter circuit of FIG. 1 to "soft switch" or to switch from the conductive state to the nonconductive state such that, during the switching transient, high voltage and current are not simultaneously applied to the switching device. Soft switching is described generally in U.S. Pat. No. 4,864,479, issued Sep. 5, 1989 in the name of Steigerwald et al. In the arrangement of FIG. 1, the presence of transformer leakage inductance Lt aids in causing current circulation which tends to promote soft switching. Mweene et al. describe switching converter operation as phase-shifted PWM, in which either the two upper or two lower controllable switches are left conductive or ON during the free-wheeling period, so that the load and magnetizing currents can continue to flow in the primary winding Tip. The Mweene et al. switching operation is described in conjunction with the amplitude-time waveforms of FIGS. 2A, 2B, 2C, 2D, 2E, 2F, and 2H. FIGS. 2A and 2B illustrate the voltages at tap points At and Bt, respectively, of FIG. 1, for approximately a 70% duty ratio or cycle, as periodically taking on the value of +Vin (corresponding to +Ed) or zero (corresponding to -RTN).

Some periods exist during which both tap points At and Bt are at the same voltage, both +Ed and zero (corresponding to -RTN). FIG. 2C plots the voltage $V_{AB}$ (or $v_A$-$v_B$) "between" nodes or taps At and Bt, which energizes the primary winding of the transformer T1. FIG. 2D plots the pulsating direct voltage VX, which appears at the rectifier bridge output point X (relative to the negative terminal of output capacitor Co) of FIG. 1 as a result of the application of $V_{AB}$ to the transformer T1. FIG. 2E plots the magnetizing current $I_M$ of transformer T1. The magnetizing current increases (becomes more positive) substantially linearly during those intervals in which $V_{AB}$ is positive, remains substantially constant when $V_{AB}$ is zero, and decreases (becomes more negative) during those intervals in which $V_{AB}$ takes on a negative value. FIG. 2F plots the primary winding current IP of transformer T1. FIG. 2G plots as a solid line the gate-to-source voltage of controllable switch Q1, and as a dotted line the gate-to-source voltage of controllable switch Q2. FIG. 2H plots as a solid line the gate-to-source voltage of controllable switch Q4, and as a dotted line the gate-to-source voltage of controllable switch Q3.

As described by Mweene et al., zero-voltage switching results from operation in which, if Q1 and Q4 are ON (the controllable current paths are conductive), and then Q1 is turned OFF (controllable current path rendered nonconductive), the load and magnetizing current (referred to the transformer primary and together designated Ip) that had been flowing in through the channel or controllable current path of Q1 commutate to the parasitic capacitance of node or tap At. This capacitance is the parallel combination of output capacitances of switches Q1 and Q2, of the transformer, and the reflected junction capacitances of two OFF-state rectifiers, namely rectifiers D2 and D3. The voltage at node At falls as the current Ip discharges the combined capacitance until the capacitance voltage reaches the voltage of the bottom rail or bus 16, at which time the capacitance voltage is clamped to the bottom rail 16 voltage by the inherent antiparallel diode of switch Q2. This transition is essentially lossless. At any time during the freewheeling period, switch Q2 can be turned ON losslessly with zero volts across its controlled current path (the drain-to-source path), so long as the transition of Q2 takes place after the turn-OFF of Q1, so as to avoid disrupting the lossless discharge of the capacitance of node At. At the end of the freewheeling interval, switch Q4 is turned OFF, and current flowing in the primary winding Tip commutates to the parasitic capacitances of node Bt. As the voltage across the transformer becomes negative, the secondary-side currents commutate from the diode D1-D4 path to the diode D2-D3 path. For a period of time, all the diodes D1 through D4 are ON, and the voltage across the transformer secondary winding T1s is essentially zero. The voltage at node Bt, and therefore the transformer voltage, appear across the transformer leakage inductance Lt. The leakage inductance is illustrated as being on the primary side for ease of explanation.

As can be seen from the timing diagrams of FIGS. 2A through 2H, all four controllable switches Q1 through Q4 are driven with close to a 50% duty cycle or ratio. The drives for Q1 and Q2 are opposite square-waves, with sufficient dead time at each transition to permit completion of the lossless charging of node At. Similarly, the drives Q3 and Q4 are also opposite square-waves with dead times. Control of the duty cycle of the H-bridge 11, the drives for the A and B legs are mutually shifted in time. During those intervals in which the two drives are 180° out-of-phase (meaning that Q4 is ON whenever Q1 is ON), the duty ratio is 100%. When the two drives are in-phase (Q3 is ON whenever Q1 is ON), the duty ratio is zero. Control of the relative drive phase of the legs allows control of the output direct voltage, and the abovementioned feedback control senses the output voltage and compares it with a reference to generate an error signal, which in turn is used to control the output voltage in a degenerative manner.

As described by Mweene et al., a resonance between the magnetizing inductance of the transformer T1 and the node Bt capacitance takes place, and with proper selection of values can achieve peak voltages greater than the applied or bus voltage. When the voltage of the parasitic capacitance at node Bt exceeds the applied voltage Vi, the inherent antiparallel diode of switch Q3 turns ON and clamps the resonant voltage until the leakage inductance current falls below zero. During this clamping interval, switch Q3 can be turned ON losslessly.

Mweene et al. further indicate that the choice of the sum of the magnetizing and load current can affect the loss of the switching transitions. The magnetizing current always has the same value, which depends upon the applied voltage Vi and the amount of phase shift between legs A and B. The load current, however, can vary by large amounts, which can adversely affect the ability to zero-voltage switch (ZVS) at low or zero load currents. Zero-voltage switching is very desirable both to maintain low losses in the power switches and in the inverse-parallel diodes of FETs when used as power switches, and tends to reduce electromagnetic interference (EMI) attributable to the switching of significant currents. The power converter regulates the output voltage. At light load the power converter has a small duty ratio, so the magnetizing current is also small, thus there is not sufficient energy for zero-voltage switching under light load operation. The loss of zero-voltage switching leads to greatly increased switching loss, and a corresponding decrease in power converter efficiency. This loss of zero-voltage switching also is electrically noisy, and leads to EMI difficulties.

Improved or alternative dc-to-dc converters are desired.

SUMMARY OF THE INVENTION

A dc-to-dc converter according to an aspect of the invention comprises first and second controllable switches. Each controllable switch includes a controllable current path, (which can be the drain-to-source path in the case of a FET switch) and a control input port. The controllable current paths of the first and second controllable switches are connected as a first half-bridge with a first tap, a first connection node adjacent the first controllable switch and remote from the first tap and a second connection node adjacent the second controllable switch and remote from the first tap. The first connection node is connected to energizing voltage of a first polarity from a first terminal of a source of direct energizing voltage, and the second connection node is connected to energizing voltage of a second polarity from the source of direct energizing voltage. The dc-to-dc converter includes third and fourth controllable switches, each including a controllable current path and a control input port. The controllable current paths of the third and fourth controllable switches are connected as a second half-bridge with a second tap, a third connection node adjacent the third controllable switch and remote from the second tap and a fourth connection node adjacent the fourth controllable switch and remote from the second tap. The third connection node is connected to energizing voltage of the first polarity from a first terminal of the source of direct energizing voltage, and the fourth connection node is connected to energizing voltage of the second polarity from the source of direct energizing voltage. A phase-shift pulse-width-modulated controller is coupled to the control input port of the first, second, third, and fourth controllable switches, for switching the first, second, third, and fourth controllable switches so that a fixed-frequency alternating voltage appears between the first and second taps. An output transformer includes primary and secondary windings. At least one inductance, which may be inherent in the output transformer or associated with a discrete inductor, connects the primary winding to the first and second taps of the half-legs, so that the alternating voltage is applied to the primary winding of the output transformer. A full-wave rectifier is connected to the secondary winding, for rectifying secondary winding current flowing under the impetus of the alternating voltage. A filter is coupled to the full-wave rectifier for producing output direct voltage for application to a load. A second transformer includes first and second mutually coupled windings. The first mutually coupled winding defines first and second terminals and the second mutually coupled winding defines first and second terminals. The mutually coupled windings of the second transformer are poled or coupled so that a voltage applied to the first terminal of the first mutually coupled winding relative to the second terminal of the first mutually coupled winding induces a voltage of the same relative polarity at the second terminal of the second mutually coupled winding relative to the first terminal of the second mutually coupled winding. The first mutually coupled winding is serially connected with a capacitor to thereby define a first serial dc-blocked circuit defining first and second ends. The second coupled winding is serially connected with another capacitor and with a circulating current inductance to thereby define a second serial dc-blocked circuit including first and second ends. The second ends of the first and second serial dc-blocked circuits are coupled to one of the first and second terminals of the source of direct energizing voltage. The first end of the first serial dc-blocked circuits is connected to one of the first and second taps of the half-bridges, and the first end of the second serial dc-blocked circuits is connected to the other one of the first and second taps.

A particular embodiment of this converter further comprises first and second resistive voltage dividers, each defining a tap at which half the applied voltage appears. The first and second resistive voltage dividers are coupled across the first and second terminals of the source of direct energizing voltage. The tap of the first resistive voltage divider is connected to the first tap of the first half-bridge, and the tap of the second resistive voltage divider is connected to the second tap of the second half-bridge. A further embodiment comprises a first damping resistance serially coupled with the first serial dc-blocked circuit and a second damping resistance serially coupled with the second serial dc-blocked circuit, wherein at least a portion of the first and second damping resistance includes the internal resistance of the first and second mutually coupled windings.

A dc-to-dc converter according to another aspect of the invention comprises first and second controllable switches, each including a controllable current path and a control input port. The controllable current paths of the first and second controllable switches are connected as a half-bridge with a first tap. A first connection node lies adjacent the first controllable switch and remote from the first tap and a second connection node lies adjacent the second controllable switch and remote from the first tap. The first connection node is connected to energizing voltage of a first polarity from a first terminal of a source of direct energizing voltage, and the second connection node is connected to energizing voltage of a second polarity from the source of direct energizing voltage. The dc-to-dc converter also includes third and fourth controllable switches, each including a controllable current path and a control input port. The controllable current paths of the third and fourth controllable switches are connected as a half-bridge with a second tap. A third connection node lies adjacent the third controllable switch and remote from the second tap and a fourth connection node lies adjacent the fourth controllable switch and remote from the second tap. The third connection node is connected to energizing voltage of the first polarity from a second terminal of the source of direct energizing voltage, and the fourth connection node is connected to energizing voltage of the second polarity from the source of direct energizing voltage. A controller is coupled to the control input port of the first, second, third, and fourth controllable switches, for switching the first, second, third, and fourth controllable switches so that an alternating voltage appears between the first and second taps. An output transformer includes primary and secondary windings. At least one inductance connects the primary winding to the first and second taps, so that the alternating voltage is applied to the primary winding of the output transformer. A full-wave rectifier, which may be a bridge rectifier, is connected to the secondary winding, for rectifying current flowing in the secondary winding under the impetus of the alternating voltage. A filter is coupled to the full-wave rectifier for producing output direct voltage for application to a load. The filter may include the combination of an inductor and a capacitor. A second transformer includes first and second mutually coupled windings. The first coupled winding defines first and second terminals, and the second coupled winding defines first and second terminals. The coupled windings of the second transformer are coupled so that a voltage applied to the first terminal of the first coupled winding relative to the second terminal of the first coupled winding induces a voltage of the same relative polarity at the second terminal of the second coupled winding relative to the first terminal of the second coupled winding. The first coupled winding is serially connected with a capacitor to thereby define a first serial dc-blocked circuit defining first and second ends, and the second coupled winding is serially connected with another capacitor to thereby define a second serial dc-blocked circuit including first and second ends. The first end of the first serial dc-blocked circuit is coupled to the first tap and the second end of the first serial dc-blocked circuit is coupled to a selected terminal of the source of direct energizing voltage. The second serial dc-blocked circuit is coupled at the second end to the selected terminal of the source of direct energizing voltage. An inductor connects the first end of the second serial dc-blocked circuit to the second tap. In one embodiment of this aspect of the invention, the converter further includes first and second resistive voltage dividers, each defining a tap at which half the applied voltage appears. The first and second resistive voltage dividers are coupled across the first and second terminals of the source of direct energizing voltage. The tap of the first resistive voltage divider is connected to the first tap, and the tap of the second resistive voltage divider is connected to the second tap. In yet another embodiment of this aspect of the invention, the dc-to-dc converter further includes a first damping resistance serially coupled with the first serial dc-blocked circuit and a second damping resistance serially coupled with the second serial dc-blocked circuit, and the damping resistances may include the internal resistance of the first and second mutually coupled windings.

DESCRIPTION OF THE INVENTION

Figure 1:
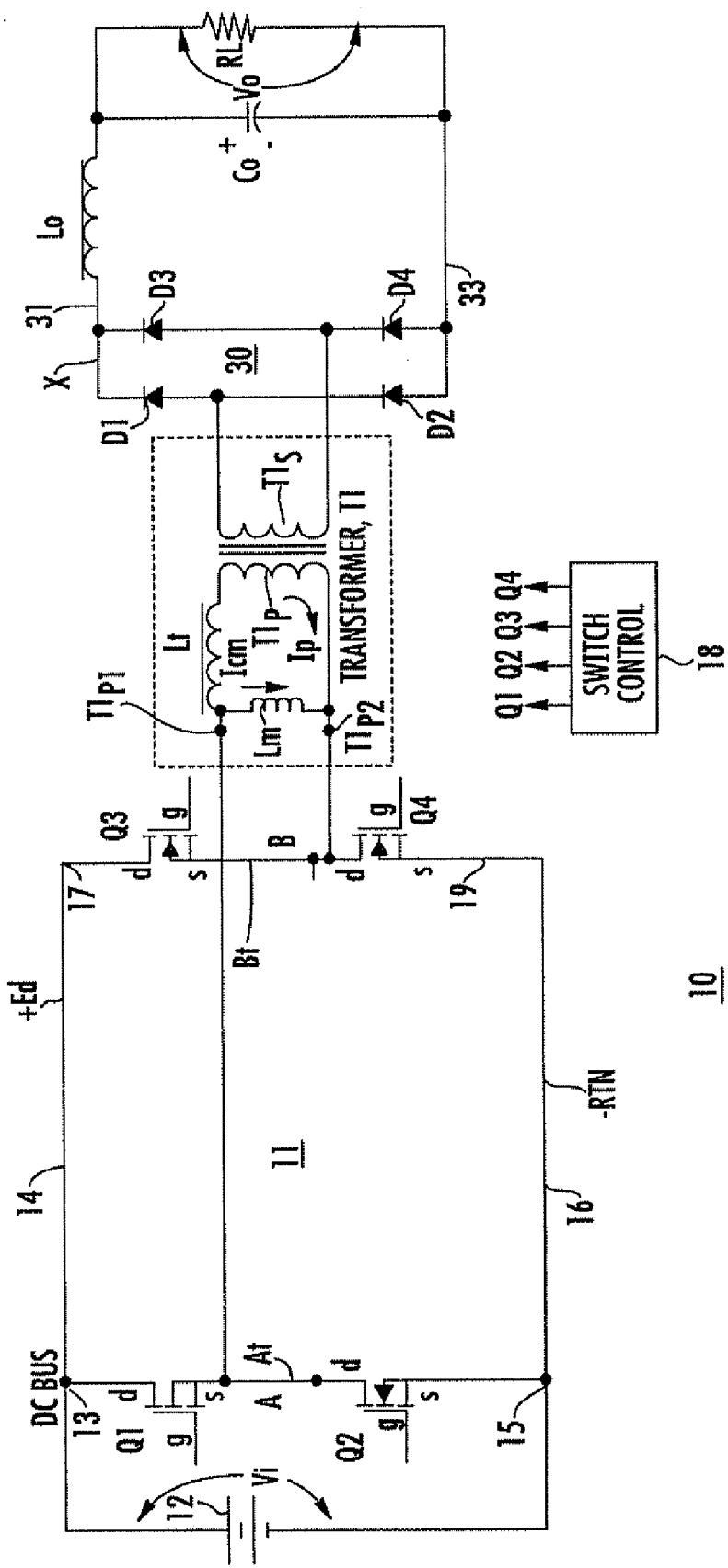
FIG. 1 is a simplified diagram in block and schematic form of a prior-art fixed- or constant-frequency dc-to-dc phase-shifted PWM switching converter.
Figure 2A:
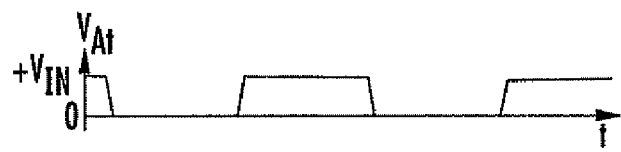
FIGS. 2A, 2B, 2C, 2D, 2E, 2F, 2G, and 2H are plots of voltages and currents associated with the converter of FIG. 1.
Figure 2B:
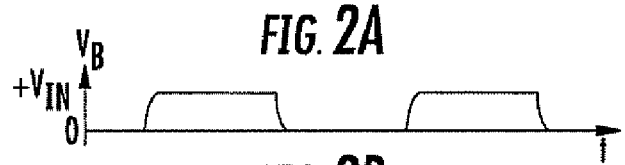
Figure 2C:
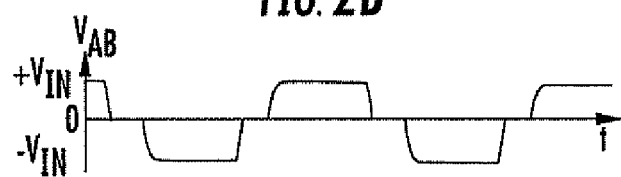
Figure 2D:
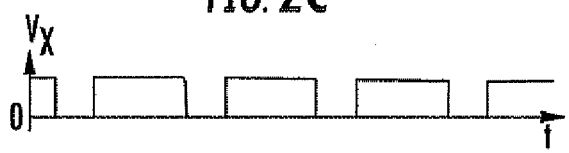
Figure 2E:
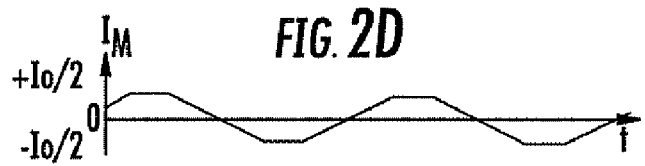
Figure 2F:
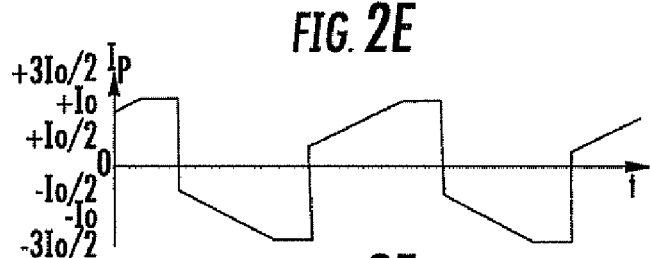
Figure 2G:
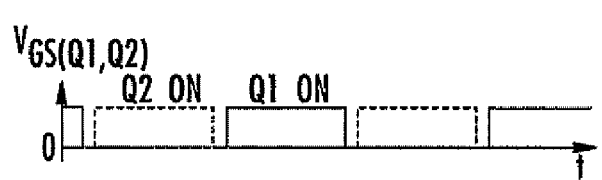
Figure 2H:
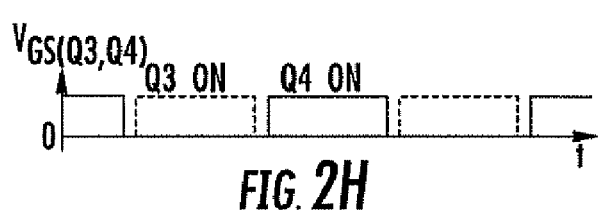

The phase-shifted PWM dc-to-dc converter of FIG. 1, and many other bridge-type dc-to-dc converters, has/have the disadvantage of tending to lose zero-voltage switching (ZVS) of the switches at reduced or zero load current. As known, this tends to decrease the efficiency of the conversion and undesirably causes heating of the switches. In the arrangement of FIG. 1, the energy necessary for ZVS is stored in the leakage inductance Lt of the output transformer T1. The leakage inductance Lt is ultimately in series with the load ($R_L$) current. Consequently, the energy stored in the leakage inductance Lt is reduced at reduced load current, and in principle becomes zero at zero load current. Thus, the available ZVS energy is reduced at light load. ZVS switching can also use energy stored in the magnetizing inductance (not illustrated) of the output transformer T1. The magnetizing inductance current is in parallel with the load current, but this has the disadvantage that, as the duty cycle is reduced at light or no load, the magnetizing current is also reduced, as with the leakage inductance. Use of the magnetizing inductance to provide zero-voltage switching (ZVS) has the further disadvantage that the magnetizing current increases at heavy load as the duty cycle increases, thus placing additional thermal or power-handling stress on the power switches or FETs.

According to an aspect of the invention, a passive auxiliary circuit is provided that increases the effective magnetizing current as the duty cycle decreases. This auxiliary circuit can be used alone, or in conjunction with a properly dimensioned magnetizing inductance of the output transformer to maintain substantially constant effective magnetizing current over a range of duty cycles and loads. Similarly, the passive auxiliary circuit can be used without significant output transformer magnetizing current, and provide necessary energy for zero-voltage switching at light load and no load operation. This in turn means that ZVS can be maintained from no load to full load range of operation.

Figure 3:
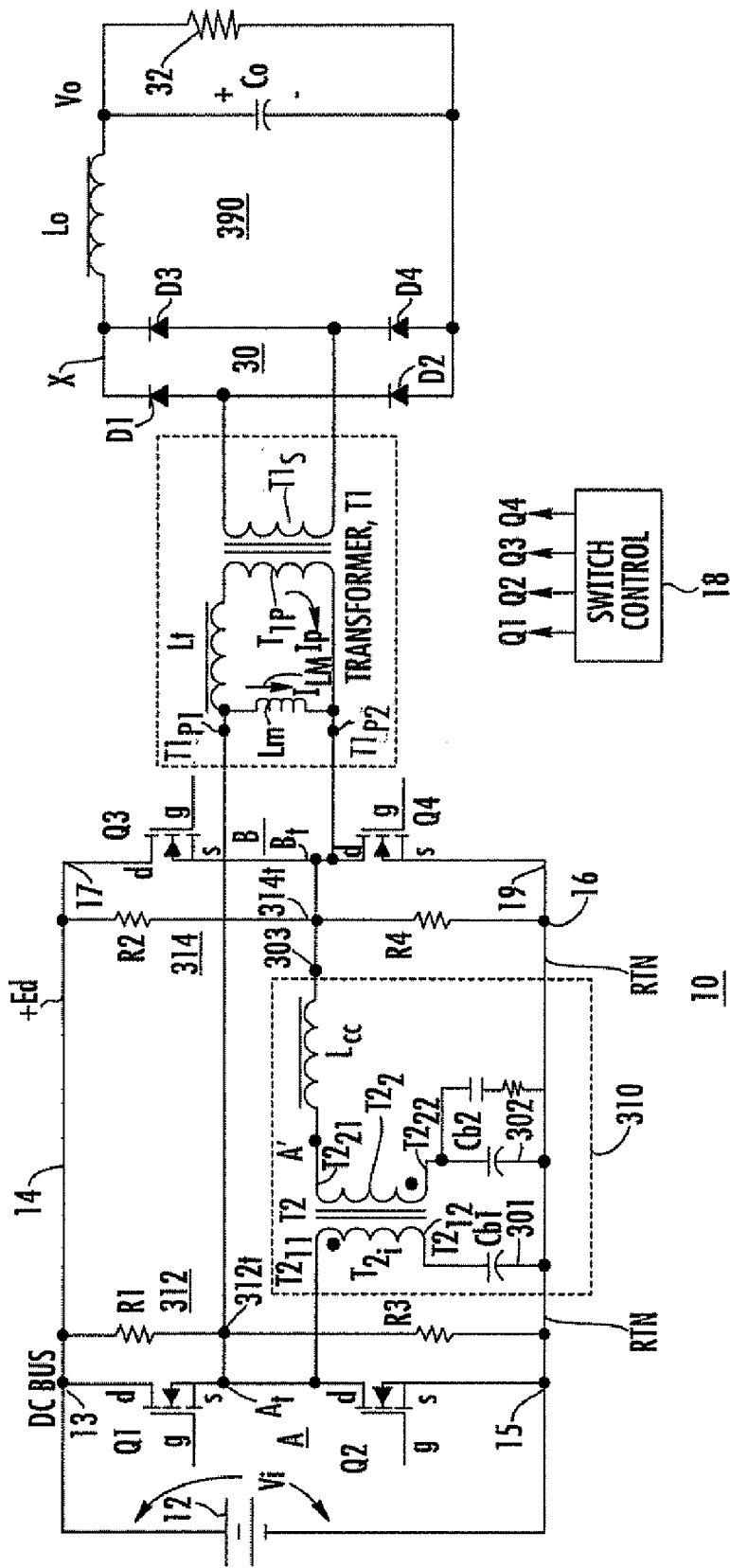
FIG. 3 is a simplified diagram in block and schematic form illustrating a dc-to-dc converter according to an aspect of the invention.

The dc-to-dc converter 100 of FIG. 3 is generally similar to that of FIG. 1, but further includes a circulating current compensator circuit illustrated within dash lines 310, and also further includes resistive voltage dividers 312 and 314. Circulating current compensator 310 of FIG. 3 includes a second transformer T2 with first and second windings $T2_1$ and $T2_2$ having the same number of turns, which is to say a turns ratio of unity. As suggested by the dot notation, the windings $T2_1$ and $T2_2$ are poled "oppositely," although this depends in practice upon the winding connections. The dot-illustrated poling means that a positive voltage instantaneously applied to transformer terminal $T2_{11}$ relative to bus 16 results in an induced negative voltage at terminal $T2_{21}$ relative to bus 16. Those skilled in the art will fully understand this polarization. Transformer winding $T2_1$ is serially connected (for alternating currents) at a terminal $T2_{12}$ with a dc blocking capacitor Cb1 to thereby form a serial combination $T2_{11}$/Cb1 which has end terminals $T2_{11}$ and 301. As illustrated in FIG. 3, transformer terminal $T2_{11}$ of one end of serial combination $T2_{11}$/Cb1 is connected to tap point At of switch leg A, and the other end point of serial combination $T2_{11}$/Cb1, namely node 301, is connected to a reference potential which is illustrated as being bus 16, although it could as easily be bus 14.

In FIG. 3, the second winding $T2_2$ of transformer T2 of the circulating current compensator 310 includes terminals $T2_{21}$ and $T2_{22}$. Transformer winding $T2_2$ of transformer T2 is serially coupled at terminal $T2_{22}$ with a dc blocking capacitor Cb2, and is serially coupled at a terminal $T2_{21}$ with an inductance designated Lcc. The inductance represented by Lcc may be provided by a discrete inductor, or by leakage inductance of transformer T2, or both. Thus, transformer winding $T2_2$, capacitor Cb2, and inductance Lcc are effectively in series for alternating currents. The end points of the serial combination of transformer winding $T2_2$, capacitor Cb2, and inductance Lcc are designated 302 and 303, with 302 being adjacent capacitor Cb2 and 303 being adjacent winding Lcc. End point 302 of the serial combination of transformer winding $T2_2$, capacitor Cb2, and inductance Lcc is connected to reference potential, which is illustrated as being bus 16, although it could as easily be bus 14. End point 303 of the serial combination of transformer winding $T2_2$, capacitor Cb2, and inductance Lcc is connected to leg B tap point Bt.

In operation of the arrangement of FIG. 3, the two inverter legs A and B are operated at a constant frequency, 50% duty cycle, with leg B shifted in phase relative to leg A to achieve control of the output pulse width, which in turn controls the output voltage of the dc-to-dc converter 100. This mode of operation is identical to the mode of operation of the Mweene et al. arrangement. As illustrated in FIG. 3, the voltage at half-leg A tap point At relative to reference potential is applied to winding T21 of transformer T2 in series with the DC blocking capacitor Cb1, and is coupled to a point A' out-of-phase (or in reverse phase), relative to reference potential, by transformer T2. Thus, the voltage at point A' of FIG. 3 is $v_{A'}$.

FIGS. 4A, 4B, 4C, and 4D illustrate the ideal voltage $v_A$ at tap At relative to reference potential, voltage at tap Bt relative to the reference potential, $V_A-v_B$, and $v_{A'}-v_B$, respectively. FIG. 4E illustrates the ideal current $i_{Lcc}$, into both nodes At and Bt, FIG. 4F illustrates the magnetizing current $i_{Lm}$ in transformer T1, FIG. 4G represents the sum of currents $i_{Lcc}$ and $i_{Lm}$, designated $i_{Lcc}+i_{Lm}$ flowing into tap point or node Bt, and FIG. 4H represents the current $i_{Lcc}-i_{Lm}$, into node At. Phase angle $\Phi$ represents the phase angle between the voltages at half-leg tap points At and Bt. The phase angle is set by the controller 18 in the same manner as for the prior-art arrangement of FIG. 1.

Figure 4:
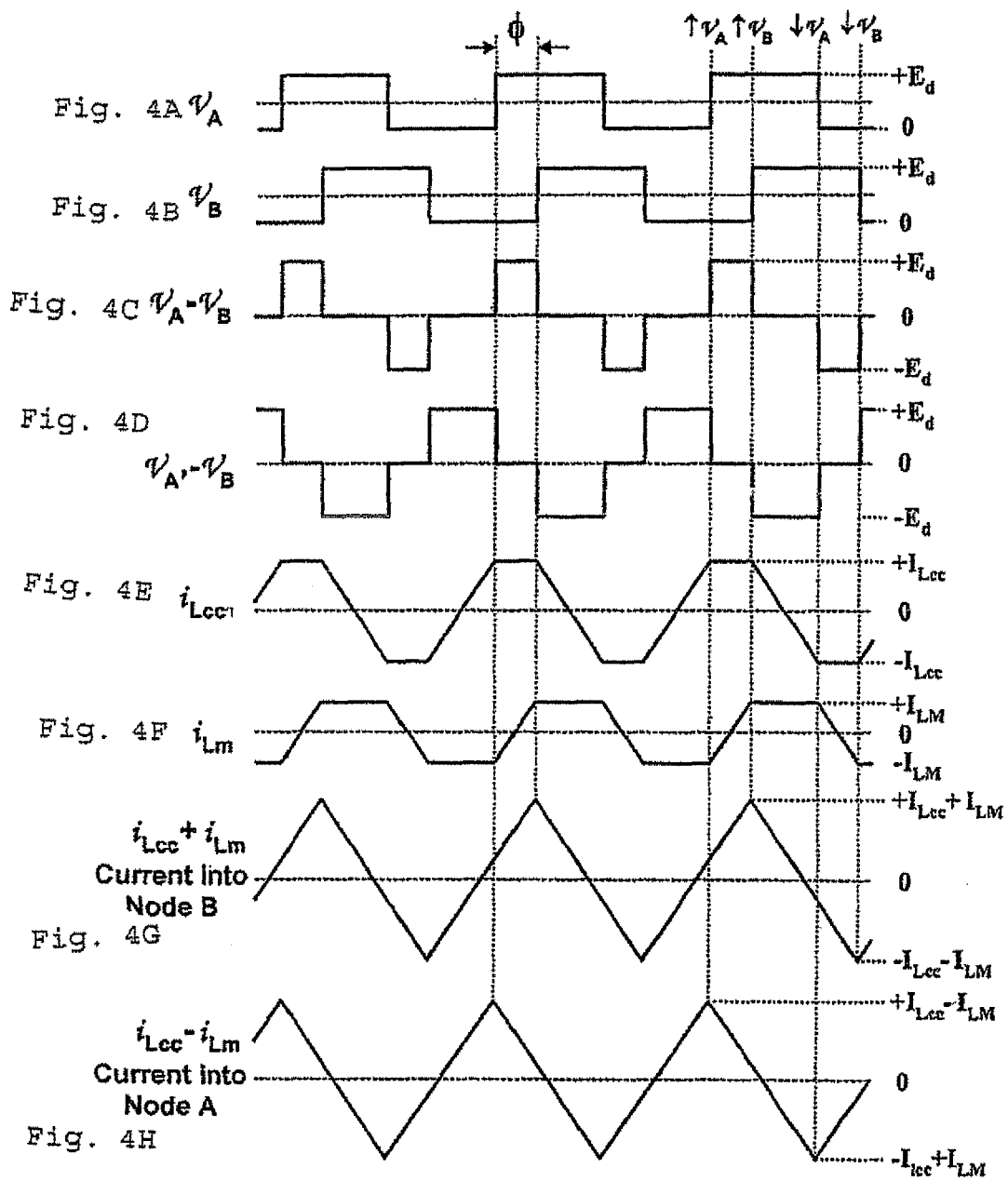
FIGS. 4A, 4B, 4C, and 4D illustrate ideal voltages appearing in the arrangement of FIG. 3 during operation.
FIGS. 4E, 4F, 4G, and 4H illustrate ideal currents.

As can be seen from the plot of $v_A$ of FIG. 4A, the voltage at leg A tap point At switches between values of zero (0) and $+E_d$, which is the voltage of bus 14. Similarly, the voltage $v_B$ at leg B tap point Bt is illustrated in FIG. 4B, and also switches between values of zero (0) and $+E_d$, although with a phase angle that differs by $\Phi$ from that of voltage $v_A$. FIG. 4C plots the difference voltage $v_A-v_B$. Difference voltage $v_A-v_E$ takes on one three values: $+E_d$, $-E_d$, or zero. It should be noted from FIG. 3 that transformer T2 of circulating current compensator 310 inverts the AC component of voltage $v_A$ and applies it as $v_{A'}$ to point V'. FIG. 4D plots the voltage difference $v_{A'}-v_B$, which represents the voltage applied across inductance $L_{cc}$. Difference voltage $v_{A'}-v_B$ also takes on one of three values: $+E_d$, $-E_d$ or zero.

As a result of the application of difference voltage $v_{A'}-v_B$ across inductance $L_{cc}$, a trapezoidal current $i_{Lcc}$ with sloped sides flows in the inductance, which is represented by the plot of FIG. 4E. The maximum values of current $i_{Lcc}$ flowing in the inductance Lcc are $\pm I_{Lcc}$. FIG. 4F plots the trapezoidal, with sloped sides, magnetizing current $i_{Lm}$ of output transformer T1, which takes on maximum values of $\pm I_{LM}$. Both the current $i_{Lcc}$ of inductance $L_{cc}$ and the magnetizing current $i_{LM}$ of magnetizing inductance $L_M$ flow into node or tap point Bt. FIG. 4G plots the sum current $i_{Lcc}+i_{LM}$ flowing into tap point Bt. The sum current $i_{Lcc}+i_{LM}$ is a triangular wave that takes on maximum values of $\pm(I_{Lcc}+I_{LM})$. FIG. 4H plots the sum current $i_{Lcc}-i_{LM}$ flowing into tap point At.

The output transformer T1 of FIG. 3 receives alternating drive voltage from tap points At and Bt. When phase angle Φ is 0°, the duty cycle is 50%, and the frequency is constant, the dc-to-dc converter 310 of FIG. 3 produces or generates minimum output voltage, because $v_A$ and $v_B$ are in-phase, and the voltage difference $v_A-v_B$ is zero. Thus, the primary winding of output transformer T1 receives no applied energizing potential, and consequently produces no output or secondary voltage which might be rectified to produce output voltage Vo. When the phase angle Φ is 180°, the voltages $v_A$ and $v_B$ are out-of-phase, and the voltage difference $v_A-v_B$ is maximum. The phase angle Φ is modified within the range of 0° and 180° to effectuate output voltage control. Those skilled in the art will recognize that corresponding ranges of phase other than from 0° and 180° will have the same effect.

In order to attain zero voltage switching (ZVS), sufficient energy must be stored and made available in order to charge and discharge the capacitances of the solid-state switches Q1, Q2, Q3, and Q4. In the prior-art arrangement of FIG. 1, the load current flows through leakage inductance $L_t$ of output transformer T1. When the load current is high, the energy stored in leakage inductance $L_t$ is at a maximum, and ZVS can be accomplished. At or near minimum load, however, the current through leakage inductance $L_t$ is minimized or zero, with the result that little energy is available for ZVS, and the switching may become lossy.

By contrast, in the arrangement of FIG. 3, the addition of the inverting transformer T2 of circulating current compensator 310 maximizes $v_{A'}-v_B$ when the phase angle Φ is 0°, corresponding to zero output load current. The maximized value of $v_{A'}-v_B$ for a phase angle of 0°, in turn, applies maximum voltage or volt-seconds across inductance $L_{cc}$, and the larger volt-seconds results in storage of maximum energy in inductance $L_{cc}$ during those intervals in which the load current is least. Consequently, during those times in which the energy storage in leakage inductance $L_t$ is least, the energy storage in circulating current compensator inductance $L_{cc}$ is maximized. Conversely, during those times in which the energy storage in leakage inductance $L_t$ is maximized at high load power, the energy storage in circulating current compensator inductance $L_{cc}$ is minimized. It is desirable that the energy storage in circulating current compensator inductance $L_{cc}$ is minimized at high load current, since at that time the energy storage in leakage inductance Lt is maximum, so that energy is available for ZVS from that source. At zero voltage across the load, when the voltages at tap points At and Bt are transitioning from zero volts to the dc bus or rail voltage together, there is a full square wave $v_{A'}-v_B$ across inductance $L_{cc}$, giving maximum circulating current. In short, the circulating current attributable to the circulating current compensator 310 increases at small load duty cycles and decreases at large load duty cycles, which is exactly the desired effect.

It should be noted that the blocking capacitors $Cb_1$, and $Cb_2$ "bias up" to the average voltages of nodes or tap points At and Bt, respectively, which should be Vi/2. To aid in biasing the tap points to the correct voltage, a first resistive voltage divider 312, including equal-value resistors R1 and R3, is coupled across buses 14 and 16, with the tap point between the resistors connected to tap point At. Similarly, a second resistive voltage divider 314, including equal-value resistors R2 and R4, is coupled across buses 14 and 16, with the tap point between the resistors connected to tap point Bt.

The analysis so far has assumed that the load current and the inductance $L_{cc}$ current both flow into node Bt. The transformer T1 magnetization current $L_m$ can also be used to assist with the zero-voltage switching. The inductance circulating current compensator inductance $L_{cc}$ and the transformer T1 magnetizing inductance $L_M$ can be considered or viewed as injecting a constant "effective" magnetizing current into nodes At and Bt, if the inductance value of $L_m$ and $L_{cc}$ are the same. Since magnetizing inductance $L_m$ and Lcc are both much larger than leakage inductance Lt, they are assumed to be constant during the resonant transitions.

As mentioned, the currents in both magnetizing inductance $L_m$ and in inductance $L_{cc}$ of FIG. 3 are trapezoidal with sloped sides. The peak current in $L_m$ increases with increasing duty cycle, and the peak current in $L_{cc}$ decreases with increasing duty cycle. These advantageously mutually compensate such that the effective magnetizing current can be maintained substantially constant over all duty cycles and loads, so that zero-voltage switching is maintained under all power converter load conditions, no-load to full load. This situation occurs when $$L_m = L_{cc} = \frac{E_d}{4 f_{sw} I_{m(eff)}} \quad (1)$$

where:

$$I_{m(eff)} = IL_{ccpk} = IL_{mpk} = \text{constant}$$

For example, the inductances can be set to give the critical value of effective magnetizing current, in which case zero-voltage switching is maintained over all duty cycles and loads.

Figure 5:
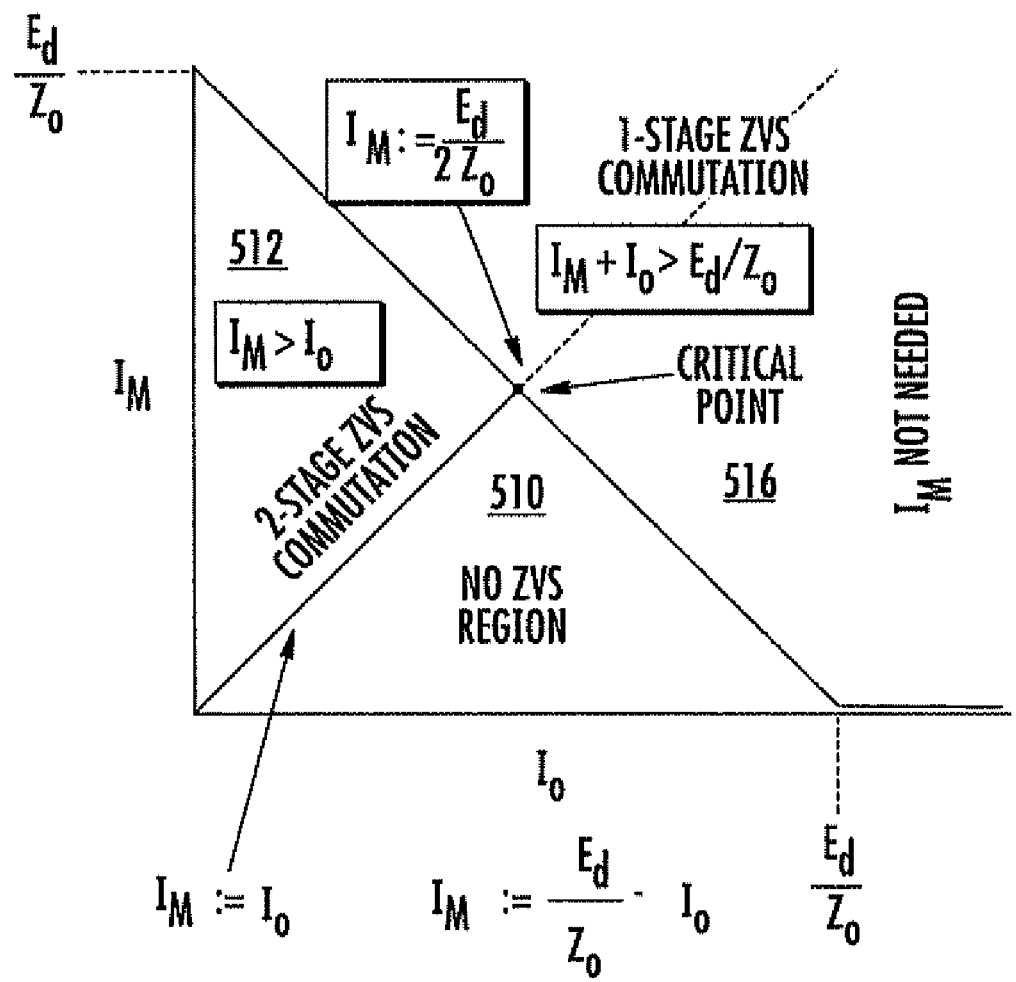
FIG. 5 is a graph that demonstrates the ZVS operating region of the auxiliary circuit.

The effective magnetizing current ILm of transformer T1 which is injected into nodes or tap points At and Et of FIG. 3 is in parallel with the current in leakage inductance Lt. Depending upon the magnitudes of current in Lt and also upon the amount of effective magnetizing current injected into node or tap point Bt, ZVS may or may not be achieved. FIG. 5 illustrates the ZVS regions as a function of load current. In FIG. 5, the units of the abscissa are Io, the output load current referred to the primary winding of transformer T1. The units of the ordinate are $I_m$, the effective magnetizing current of transformer T1. The plot of FIG. 5 is divided into three regions, the lowermost of which is designated as a "No ZVS region" 510. The other two are the left-most region 512 and the last region is designated 516. Region 512 is one in which the magnetizing current $L_m$ exceeds the leakage current through $L_t$, $I_m > I_o$, and gives rise to commutation that takes place in two intervals (or topological modes). Region 516 is one in which the sum of the magnetizing current $L_m$ and the load current Io referred to the primary is given by $$I_M + I_o > \frac{E_d}{Z_0}$$

where:

$I_M$ is the magnetizing current;

$I_o$ is the output or load current Io referred to the primary winding;

$E_d$ is the bus voltage; and $Z_o$ is the square root of the leakage inductance divided by the capacitance of the switching device which is to be commutated.

Region 516 also corresponds with ZVS operation, and more particularly with one-stage ZVS commutation in which the commutation takes place in one transient interval (one topological mode). The junction of regions 510, 512, and 516 occurs at a "critical point," at which ZVS is guaranteed under all load conditions. The critical point is defined by $$I_m = \frac{E_d}{2Z_0} \quad (2)$$

where $$Z_0 = \sqrt{\frac{L_r}{2C_j}}$$

where:

$L_r$ is the output transformer T1 leakage inductance Lt, and Cj is the capacitance of a switch (e.g., Q1) in parallel with any reflected output diode capacitance and any other parasitic capacitance (such as transformer-winding-to-ground capacitance); and $C_j$ is the total capacitance across each power FET, including the FET output capacitance, $C_{oss}$, diode junction capacitance, and any external capacitance.

While second transformer T2 has been described as having the same number of turns on its primary and secondary windings, the turns ratio is not believed to be critical.

A dc-to-dc converter (100) according to an aspect of the invention comprises first (Q1) and second (Q2) controllable switches. Each controllable switch includes a controllable current path (drain-to-source) and a control input port (gate). The controllable current paths (drain-to-source) of the first (Q1) and second (Q2) controllable switches are connected as a half-bridge (A) with a first tap (At), a first connection node (13) adjacent the first controllable switch (Q1) and remote from the first tap (At) and a second connection node (15) adjacent the second controllable switch (Q2) and remote from the first tap (At). The first connection node (12) is connected to energizing voltage of a first polarity from a first (+) terminal of a source (12) of direct energizing voltage, and the second connection node (15) is connected to energizing voltage of a second polarity from the source (12) of direct energizing voltage. The dc-to-dc converter includes third (Q3) and fourth (Q4) controllable switches, each including a controllable current (drain-to-source) path and a control input port (gate). The controllable current (drain-to-source) paths of the third (Q3) and fourth (Q4) controllable switches are connected as a half-bridge (B) with a second tap (Bt), a third connection node (17) adjacent the third controllable switch (Q3) and remote from the second tap (Bt) and a fourth connection node (19) adjacent the fourth controllable switch (Q4) and remote from the second tap (Bt). The third connection node (17) is connected to energizing voltage of the first polarity from a first (+) terminal of the source (12) of direct energizing voltage, and the fourth connection node (18) is connected to energizing voltage of the second polarity from the source (12) of direct energizing voltage. A phase-shift pulse-width-modulated (PWM) controller (18) is coupled to the control input port (g) of the first (Q1), second (Q2), third (Q3), and fourth (Q4) controllable switches, for switching the first, second, third, and fourth controllable switches so that a fixed-frequency alternating voltage ($V_{AB}$) appears between the first (At) and second (Bt) taps. An output transformer (T1) includes primary (T1p) and secondary (T1s) windings. At least one inductance (Lt), which may be inherent in the output transformer or part of a discrete inductor, connects the primary winding to the first (At) and second (Bt) taps, so that the alternating voltage ($V_{AB}$) is applied to the primary winding (T1p) of the output transformer (T1). A full-wave rectifier (30), which may be a bridge rectifier, current doubler, or voltage doubler, is connected to the secondary winding (T1s), for rectifying secondary winding (T1s) current flowing under the impetus of the alternating voltage ($V_{AB}$). A filter is coupled to the full-wave rectifier (30) for producing output direct voltage (Vo) for application to a load (32). The filter may include the serial combination of an inductor (Lo) and a capacitor (Co) across which the output direct voltage is generated. A second transformer (T2) includes first ($T2_1$) and second ($T2_2$) mutually coupled windings. The first mutually coupled winding ($T2_1$) defines first ($T2_{11}$) and second terminals ($T2_{12}$) and the second mutually coupled winding ($T2_2$) defines first ($T2_{21}$) and second ($T2_{22}$) terminals. The mutually coupled windings of the second transformer (T2) are poled or coupled so that a voltage applied to the first ($T2_{11}$) terminal of the first mutually coupled winding ($T2_1$) relative to the second ($T2_{12}$) terminal of the first mutually coupled winding ($T2_1$) induces a voltage of the same relative polarity at the second terminal ($T2_{22}$) of the second mutually coupled winding ($T2_2$) relative to the first terminal ($T2_{21}$) of the second mutually coupled winding ($T2_2$). The first mutually coupled winding ($T2_1$) is serially connected with a capacitor (Cb1) to thereby define a first serial dc-blocked circuit ($T2_1$, Cb1) defining first ($T2_{11}$) and second (301) ends. The second coupled winding ($T2_2$) is serially connected with another capacitor (Cb2) and with a circulating current inductance (Lcc) to thereby define a second serial dc-blocked circuit ($T2_2$, Cb2, $L_{cc}$) including first (303) and second (302) ends. The second ends (301, 302) of the first and second serial dc-blocked circuits ($T2_1$, Cb1; $T2_2$, Cb2, $L_{cc}$) are coupled to one of the first (+Ed) and second (-RTN) terminals of the source (12) of direct energizing voltage. The first end ($T2_{11}$) of the first serial dc-blocked circuits ($T2_1$, Cb1) is connected to one of the first (At) and second (Bt) taps, and the first end (303) of the second serial dc-blocked circuits ($T2_2$, Cb2, $L_{cc}$) is connected to the other one (Bt) of the first (At) and second (Bt) taps.

A particular embodiment of this converter further comprises first (312) and second (314) resistive voltage dividers, each defining a tap (312t; 314t) at which half the applied voltage appears. The first (312) and second (314) resistive voltage dividers are coupled across the first (+Ed) and second (-RTN) terminals of the source (12) of direct energizing voltage. The tap (312t) of the first resistive voltage divider (312) is connected to the first tap (At) of the first half-bridge (A), and the tap (314t) of the second resistive voltage divider (312)

is connected to the second tap (Bt) of the second half-bridge (B). A further embodiment comprises a first damping resistance serially coupled with the first serial dc-blocked circuit ($T2_1$, Cb1) and a second damping resistance serially coupled with the second serial dc-blocked circuit ($T2_2$, Cb2), wherein at least a portion of the first and second damping resistance includes the internal resistance of the first ($T2_1$) and second ($T2_2$) mutually coupled windings.

A particular embodiment of this converter further comprises first (312) and second (314) resistive voltage dividers, each defining a tap (312t; 314t) at which half the applied voltage appears. The first (312) and second (314) resistive voltage dividers are coupled across the first (+) and second (−) terminals of the source (12) of direct energizing voltage. The tap (312t) of the first resistive voltage divider (312) is connected to the first tap (At) of the first half-bridge (A), and the tap (314t) of the second resistive voltage divider (312) is connected to the second tap (Bt) of the second half-bridge (B). A further embodiment comprises a first damping resistance serially coupled with the first serial dc-blocked circuit ($T2_1$, Cb1) and a second damping resistance serially coupled with the second serial dc-blocked circuit ($T2_2$, Cb2), wherein at least a portion of the first and second damping resistance includes the internal resistance of the first ($T2_1$) and second ($T2_2$) mutually coupled windings.

A dc-to-dc converter according to another aspect of the invention comprises first (Q1) and second (Q2) controllable switches, each including a controllable current path (drain-to-source) and a control input port (gate). The controllable current paths of the first (Q1) and second (Q2) controllable switches are connected as a half-bridge (A) with a first tap (At). A first connection node (15) lies adjacent the first controllable switch (Q1) and remote from the first tap (At) and a second connection node (15) lies adjacent the second controllable switch and remote from the first tap (At). The first connection node (13) is connected (14) to energizing voltage of a first polarity from a first (+) terminal of a source (12) of direct energizing voltage, and the second connection node (15) is connected (16) to energizing voltage of a second polarity from the source (12) of direct energizing voltage. The dc-to-dc converter also includes third (Q3) and fourth (Q4) controllable switches, each including a controllable current path (drain-to-source) and a control input port (gate). The controllable current paths of the third (Q3) and fourth (Q4) controllable switches are connected as a half-bridge with a second tap (Bt). A third connection node (17) lies adjacent the third controllable switch (Q3) and remote from the second tap (Bt) and a fourth connection node (19) lies adjacent the fourth controllable switch (Q4) and remote from the second tap (Bt). The third connection node (17) is connected to energizing voltage of the first polarity from a second (+Ed) terminal of the source (12) of direct energizing voltage, and the fourth connection node (19) is connected to energizing voltage of the second polarity from the source (12) of direct energizing voltage. A controller (18) is coupled to the control input port (g) of the first (Q1), second (Q2), third (Q3), and fourth (Q4) controllable switches, for switching the first, second, third, and fourth controllable switches so that an alternating voltage appears between the first (At) and second (Bt) taps. An output transformer (T1) includes primary (T1p) and secondary (T1S) windings. At least one inductance (Lt) connects the primary winding (T1p) to the first (At) and second (Bt) taps, so that the alternating voltage is applied to the primary winding (T1p) of the output transformer. A full-wave rectifier (30) is connected to the secondary winding (T1s), for rectifying current flowing in the secondary winding (T1s) under the impetus of the alternating voltage. A filter (390) is coupled to the full-wave bridge rectifier (30) for producing output direct voltage for application to a load (32). The filter (390) may include the combination of an inductor (Lo) and a capacitor (Co). A second transformer (T2) includes first ($T2_1$) and second ($T2_2$) mutually coupled windings. The first coupled winding ($T2_1$) defines first ($T2_{11}$) and second terminals ($T2_{12}$), and the second coupled winding ($T2_2$) defines first ($T2_{21}$) and second ($T2_{22}$) terminals. The coupled windings ($T2_1$, $T2_2$) of the second transformer (T2) are coupled so that a voltage applied to the first ($T2_{11}$) terminal of the first coupled winding ($T2_1$) relative to the second ($T2_{12}$) terminal of the first coupled winding ($T2_1$) induces a voltage of the same relative polarity at the second terminal ($T2_{22}$) of the second coupled winding ($T2_2$) relative to the first terminal ($T2_{21}$) of the second coupled winding ($T2_2$). The first coupled winding ($T2_1$) is serially connected with a capacitor (Cb1) to thereby define a first serial dc-blocked circuit ($T2_1$, Cb1) defining first ($T2_{11}$) and second (301) ends, and the second coupled winding ($T2_2$) is serially connected with another capacitor (Cb2) to thereby define a second serial dc-blocked circuit ($T2_2$, Cb2) including first ($T2_{21}$) and second (302) ends. The first end ($T2_{11}$) of the first serial dc-blocked circuit ($T2_1$, Cb1) is coupled to the first tap (At) and the second end (301) of the first serial dc-blocked circuit ($T2_1$, Cb1) is coupled to a selected terminal (-RTN) of the source (12) of direct energizing voltage. The second serial dc-blocked circuit ($T2_2$, Cb2) is coupled at the second end (302) to the selected terminal (RTN) of the source (12) of direct energizing voltage. An inductor ($L_{cc}$) connects the first end ($T2_{21}$) of the second serial dc-blocked circuit ($T2_2$, Cb2) to the second tap (Bt). In one embodiment of this aspect of the invention, the converter further includes first (312) and second (314) resistive voltage dividers, each defining a tap (312t; 314t) at which half the applied voltage appears. The first and second resistive voltage dividers are coupled across the first (+Ed) and second (-RTN) terminals of the source (12) of direct energizing voltage. The tap (312t) of the first resistive voltage divider (312) is connected to the first tap (At), and the tap (314t) of the second resistive voltage divider (314) is connected to the second tap (Bt). In yet another embodiment of this aspect of the invention, the dc-to-dc converter further includes a first damping resistance serially coupled with the first serial dc-blocked circuit ($T2_1$, Cb1) and a second damping resistance serially coupled with the second serial dc-blocked circuit ($T2_2$, Cb2), and the damping resistances may include the internal resistance of the first ($T2_1$) and second ($T2_2$) mutually coupled windings.

What is claimed is:

1. A dc-to-dc converter comprises:
    first and second controllable switches, each controllable switch including a controllable current path and a control input port, said controllable current paths of said first and second controllable switches being connected as a first half-bridge with a first tap, a first connection node adjacent said first controllable switch and remote from the first tap, and a second connection node adjacent said second controllable switch and remote from said first tap, said first connection node being connected to energizing voltage of a first polarity from a first terminal of a source of direct energizing voltage, and said second connection node being connected to energizing voltage of a second polarity from said source of direct energizing voltage;
    third and fourth controllable switches, each including a controllable current path and a control input port, said controllable current paths of said third and fourth controllable switches being connected as a second half-bridge with a second tap, a third connection node adjacent said third controllable switch and remote from said second tap, and a fourth connection node adjacent said fourth controllable switch and remote from said second tap, said third connection node being connected to energizing voltage of the first polarity from said first terminal of said source of direct energizing voltage, and said fourth connection node being connected to energizing voltage of the second polarity from said source of direct energizing voltage;

a phase-shift pulse-width-modulated controller coupled to said control input port of said first, second, third, and fourth controllable switches, for switching the first, second, third, and fourth controllable switches so that a fixed-frequency alternating voltage appears between said first and second taps of said half-bridges;

an output transformer including primary and secondary windings;

at least one inductance connecting said primary winding of said output transformer to said first and second taps, so that said alternating voltage is applied to said primary winding of said output transformer;

a full-wave rectifier (30) connected to the secondary winding of said output transformer, for rectifying secondary winding current flowing under the impetus of said alternating voltage;

a filter coupled to said full-wave rectifier for producing output direct voltage for application to a load;

a second transformer including first and second mutually coupled windings, said first mutually coupled winding defining first and second terminals, and said second mutually coupled winding defining first and second terminals, said mutually coupled windings of said second transformer being coupled so that a voltage applied to said first terminal of said first mutually coupled winding relative to the second terminal of said first mutually coupled winding induces a voltage of the same relative polarity at said second terminal of said second mutually coupled winding relative to said first terminal of said second mutually coupled winding, said first mutually coupled winding being serially connected with a capacitor to thereby define a first serial dc-blocked circuit defining first and second ends, said second mutually coupled winding being serially connected with another capacitor and with a circulating current inductance to thereby define a second serial dc-blocked circuit including first and second ends, said second ends of said first and second serial dc-blocked circuits being coupled to one of said first and second terminals of said source of direct energizing voltage, said first end of said first serial dc-blocked circuits being connected to one of said first and second taps, and the first end of said second serial dc-blocked circuits being connected to the other one of said first and second taps.

2. A converter according to claim 1, further comprising first and second resistive voltage dividers, each defining a tap at which half the applied voltage appears, said first and second resistive voltage dividers being coupled across said first and second terminals of said source of direct energizing voltage, said tap of said first resistive voltage divider being connected to said first tap of said first half-bridge, and said tap of said second resistive voltage divider being connected to the second tap of said second half-bridge.

3. A converter according to claim 1, further comprising a first damping resistance serially coupled with the first serial dc-blocked circuit and a second damping resistance serially coupled with the second serial dc-blocked circuit.

4. A dc-to-dc converter, comprising:

first and second controllable switches, each including a controllable current path and a control input port, said controllable current paths of said first and second controllable switches being connected as a half-bridge with a first tap, a first connection node adjacent said first controllable switch and remote from said first tap and a second connection node adjacent said second controllable switch and remote from said first tap, said first connection node being connected to energizing voltage of a first polarity from a first terminal of a source of direct energizing voltage, and said second connection node being connected to energizing voltage of a second polarity from said source of direct energizing voltage;

third and fourth controllable switches, each including a controllable current path and a control input port, said controllable current paths of said third and fourth controllable switches being connected as a half-bridge with a second tap, a third connection node adjacent said third controllable switch and remote from said second tap and a fourth connection node adjacent said fourth controllable switch and remote from said second tap, said third connection node being connected to energizing voltage of said first polarity from a second terminal of said source of direct energizing voltage, and said fourth connection node being connected to energizing voltage of said second polarity from said source of direct energizing voltage;

a control arrangement coupled to said control input port of said first, second, third, and fourth controllable switches, for switching said first, second, third, and fourth controllable switches so that an alternating voltage appears between said first and second taps;

an output transformer including primary and secondary windings;

at least one inductance connecting said primary winding to said first and second taps, so that said alternating voltage is applied to said primary winding;

a full-wave rectifier connected to said secondary winding, for rectifying current flowing under the impetus of said alternating voltage; and a filter coupled to said full-wave rectifier for producing output direct voltage for application to a load;

a second transformer including first and second mutually coupled windings, said first coupled winding defining first and second terminals and said second coupled winding defining first and second terminals, said coupled windings of said second transformer being coupled so that a voltage applied to said first terminal of said first coupled winding relative to said second terminal of said first coupled winding induces a voltage of the same relative polarity at said second terminal of said second coupled winding relative to said first terminal of said second coupled winding, said first coupled winding being serially connected with a capacitor to thereby define a first serial dc-blocked circuit defining first and second ends, and said second coupled winding being serially connected with another capacitor to thereby define a second serial dc-blocked circuit including first and second ends, said first end of said first serial dc-blocked circuit being coupled to said first tap and said second end of said first serial dc-blocked circuit to a selected terminal of said source of direct energizing voltage, said second serial dc-blocked circuit being coupled at said second end to said selected terminal of said source of direct energizing voltage; and an inductor connecting said first end of said second serial dc-blocked circuit to said second tap.

5. A converter according to claim 4, further comprising first and second resistive voltage dividers, each defining a tap at which half the applied voltage appears, said first and second resistive voltage dividers being coupled across said first and second terminals of said source of direct energizing voltage, said tap of said first resistive voltage divider being connected to said first tap and said tap of said second resistive voltage divider being connected to said second tap.

6. A converter according to claim 4, further comprising a first damping resistance serially coupled with said first serial dc-blocked circuit and a second damping resistance serially coupled with said second serial dc-blocked circuit.

7. A converter according to claim 6, wherein at least a portion of said first and second damping resistance includes the internal resistance of said first and second mutually coupled windings.

8. A dc-to-dc converter, comprising:
first and second switches connected as a first half-bridge with a first tap, said first switch connected to energizing voltage of a first polarity from a source of direct energizing voltage, and said second switch connected to energizing voltage of a second polarity from said source of direct energizing voltage;
third and fourth switches connected as a second half-bridge with a second tap, said third switch connected to energizing voltage of the first polarity from said source of direct energizing voltage, and said fourth switch connected to energizing voltage of the second polarity from said source of direct energizing voltage;
a phase-shift pulse-width-modulated controller coupled to control input ports of each of said first, second, third, and fourth switches, for switching the first, second, third, and fourth switches so that a fixed-frequency alternating voltage appears between said first and second taps of said half-bridges;
an output transformer including primary and secondary windings;
at least one inductance connecting said primary winding of said output transformer to said first and second taps, so that said alternating voltage is applied to said primary winding of said output transformer;
a rectifier connected to the secondary winding of said output transformer, for rectifying secondary winding current flowing under the impetus of said alternating voltage;
a filter coupled to said rectifier for producing output direct voltage for application to a load; and
a second transformer including first and second mutually coupled windings, said first mutually coupled winding being serially connected with a capacitor, said second mutually coupled winding being serially connected with another capacitor.

9. The converter according to claim 8, wherein each of said first and second switches includes a controllable current path, said controllable current paths of said first and second controllable switches being connected as said first half-bridge with said first tap, and wherein each of said third and fourth controllable switches includes a controllable current path, said controllable current paths of said third and fourth controllable switches being connected as said second half-bridge with said second tap.

10. The converter according to claim 8, further comprising:
a first connection node adjacent said first switch and remote from the first tap, and
a second connection node adjacent said second switch and remote from said first tap,
a third connection node adjacent said third switch and remote from said second tap, and
a fourth connection node adjacent said fourth controllable switch and remote from said second tap,
wherein said first connection node is connected to energizing voltage the first polarity from said source of direct energizing voltage, and said second connection node is connected to energizing voltage of the second polarity from said source of direct energizing voltage; and
wherein said third connection node is connected to energizing voltage of the first polarity from said first terminal of said source of direct energizing voltage, and said fourth connection node is connected to energizing voltage of the second polarity from said source of direct energizing voltage.

11. A converter according to claim 10, further comprising first and second resistive voltage dividers, each defining a tap at which half the applied voltage appears, said first and second resistive voltage dividers being coupled across said first and second terminals of said source of direct energizing voltage, said tap of said first resistive voltage divider being connected to said first tap of said first half-bridge, and said tap of said second resistive voltage divider being connected to the second tap of said second half-bridge.

12. The converter according to claim 8, wherein said rectifier is a full-wave rectifier.

13. The converter according to claim 8, wherein the first mutually coupled winding of the second transformer defines first and second terminals, and said second mutually coupled winding of the second transformer defines first and second terminals, said mutually coupled windings of said second transformer being coupled so that a voltage applied to said first terminal of said first mutually coupled winding relative to the second terminal of said first mutually coupled winding induces a voltage of the same relative polarity at said second terminal of said second mutually coupled winding relative to said first terminal of said second mutually coupled winding.

14. The converter according to claim 13,
wherein said first mutually coupled winding that is serially connected with said capacitor thereby defines a first serial dc-blocked circuit defining first and second ends;
wherein said second mutually coupled winding that is serially connected with said another capacitor and with a circulating current inductance thereby defines a second serial dc-blocked circuit including first and second ends;
wherein said second ends of said first and second serial dc-blocked circuits are coupled to one of a first terminal and a second terminal of said source of direct energizing voltage;
wherein said first end of said first serial dc-blocked circuits is connected to one of said first and second taps; and
wherein the first end of said second serial dc-blocked circuits is connected to the other one of said first and second taps.

15. A converter according to claim 14, further comprising a first damping resistance serially coupled with the first serial dc-blocked circuit and a second damping resistance serially coupled with the second serial dc-blocked circuit.

16. A dc-to-dc converter, comprising:
first and second controllable switches-connected as a half-bridge with a first tap, said first controllable switch connected to energizing voltage of a first polarity from a source of direct energizing voltage, and said second controllable switch connected to energizing voltage of a second polarity from said source of direct energizing voltage;

third and fourth controllable switches connected as a half-bridge with a second tap, said third controllable switch connected to energizing voltage of said first polarity from a second terminal of said source of direct energizing voltage, and said fourth controllable switch connected to energizing voltage of said second polarity from said source of direct energizing voltage;

a control arrangement coupled to a control input port of each of said first, second, third, and fourth controllable switches, for switching said first, second, third, and fourth controllable switches so that an alternating voltage appears between said first and second taps;

an output transformer including primary and secondary windings;

at least one inductance connecting said primary winding to said first and second taps, so that said alternating voltage is applied to said primary winding;

a rectifier connected to said secondary winding, for rectifying current flowing under the impetus of said alternating voltage; and a filter coupled to said rectifier for producing output direct voltage for application to a load;

a second transformer including first and second mutually coupled windings, said first coupled winding being serially connected with a capacitor to thereby define a first serial dc-blocked circuit coupled to said first tap, and said second coupled winding being serially connected with another capacitor to thereby define a second serial dc-blocked circuit coupled to a selected terminal of a source of direct energizing voltage; and an inductor connecting said first end of said second serial dc-blocked circuit to said second tap.

17. A converter according to claim 16, further comprising first and second resistive voltage dividers, each defining a tap at which half the applied voltage appears, said first and second resistive voltage dividers being coupled across first and second terminals of said source of direct energizing voltage, said tap of said first resistive voltage divider being connected to said first tap and said tap of said second resistive voltage divider being connected to said second tap.

18. The dc-to-dc converter of claim 16,
wherein each of said first and second controllable switches includes a controllable current path and a control input port, said controllable current paths of said first and second controllable switches being connected as said half-bridge with said first tap; and
wherein each of said third and fourth controllable switches includes a controllable current path and a control input port, said controllable current paths of said third and fourth controllable switches being connected as said half-bridge with said second tap.

19. The dc-to-dc converter of claim 16, further comprising,
a first connection node adjacent said first controllable switch and remote from said first tap;
a second connection node adjacent said second controllable switch and remote from said first tap;
a third connection node adjacent said third controllable switch and remote from said second tap; and
a fourth connection node adjacent said fourth controllable switch and remote from said second tap;
wherein said first connection node is connected to energizing voltage of said first polarity from said source of direct energizing voltage, and said second connection node is connected to energizing voltage of said second polarity from said source of direct energizing voltage; and
wherein said third connection node is connected to energizing voltage of said first polarity from said source of direct energizing voltage, and said fourth connection node being connected to energizing voltage of said second polarity from said source of direct energizing voltage.

20. The dc-to-dc converter of claim 16, wherein said rectifier is a full-wave rectifier.

21. The dc-to-dc converter of claim 16, wherein said first mutually coupled winding of said second transformer defines first and second terminals and said second mutually coupled winding of said second transformer defines first and second terminals.

22. The dc-to-dc converter of claim 21, wherein said first and second mutually coupled windings of said second transformer are coupled so that a voltage applied to said first terminal of said first mutually coupled winding relative to said second terminal of said first mutually coupled winding induces a voltage of the same relative polarity at said second terminal of said second mutually coupled winding relative to said first terminal of said second mutually coupled winding.

23. The dc-to-dc converter of claim 16, wherein said first serial dc-blocked circuit has first and second ends and said second serial dc-blocked circuit has first and second ends, said first end of said first serial dc-blocked circuit is coupled to said first tap and said second end of said first serial dc-blocked circuit is connected to a selected terminal of said source of direct energizing voltage, and said second serial dc-blocked circuit is coupled at said second end to said selected terminal of said source of direct energizing voltage.

24. A converter according to claim 23, further comprising a first damping resistance serially coupled with said first serial dc-blocked circuit and a second damping resistance serially coupled with said second serial dc-blocked circuit.

25. A converter according to claim 24, wherein at least a portion of said first and second damping resistance includes the internal resistance of said first and second mutually coupled windings.

* * * * *